(12) United States Patent
Hashimoto (10) Patent No.: US 8,531,784 B2
(45) Date of Patent: Sep. 10, 2013

(54) IMAGING LENS

(75) Inventor: Masaya Hashimoto, Sukagawa (JP)

(73) Assignee: Kantatsu Co., Ltd., Yaita-shi (JP)

(*) Notice: Subject to any disclaimer, the term of this patent is extended or adjusted under 35 U.S.C. 154(b) by 7 days.

(21) Appl. No.: 13/278,355

(22) Filed: Oct. 21, 2011

(65) Prior Publication Data

US 2012/0250167 A1   Oct. 4, 2012

(30) Foreign Application Priority Data

Mar. 30, 2011   (JP) .................................. 2011-074109

(51) Int. Cl.
*G02B 9/08* (2006.01)
*G02B 9/60* (2006.01)

(52) U.S. Cl.
USPC ........... 359/738; 359/714; 359/739; 359/763; 359/764

(58) Field of Classification Search
USPC ........................ 359/714, 738, 739, 763, 764
See application file for complete search history.

(56) References Cited

U.S. PATENT DOCUMENTS

2011/0249348 A1*   10/2011   Kubota et al. ................. 359/764

FOREIGN PATENT DOCUMENTS

| JP | 2007-264180 A | 10/2007 |
| JP | 2007-298572 A | 11/2007 |
| JP | 2010-262269 A | 11/2010 |

* cited by examiner

*Primary Examiner* — Evelyn A. Lester
(74) *Attorney, Agent, or Firm* — Westerman, Hattori, Daniels & Adrian, LLP (57) ABSTRACT

An imaging lens includes: an aperture stop; a biconvex first lens directing convex surfaces toward an object and an image; a second lens directing a convex surface toward the object near the optical axis and having negative refractive power; a biconvex third lens directing convex surfaces toward the object and the image near the optical axis; a fourth lens directing a concave surface toward the object near the optical axis and having positive refractive power; and a fifth lens directing a convex surface toward the object near the optical axis and having negative refractive power. The aperture stop and the first to fifth lenses are arranged in this order from the object side, and a conditional expression 1 being 0.50<f1/f<0.76 is satisfied, where f1 represents the focal length of the first lens and f represents the focal length of the entire imaging lens.

12 Claims, 8 Drawing Sheets

IMAGING LENS

The present application is based on and claims priority of Japanese patent application No. 2011-074109 filed on Mar. 30, 2011, the entire contents of which are hereby incorporated by reference.

BACKGROUND OF THE INVENTION

1. Field of the Invention

The present invention relates to an imaging lens for solid-state image sensors for use in small imaging devices for use in small, thin electronic apparatuses such as mobile terminals, including cellular phones and mobile game machines, and personal digital assistants (PDAs).

2. Description of the Related Art

As the market for mobile terminals including an imaging device expands in recent years, a miniaturized solid-state image sensor having a high pixel number has been mounted on such imaging devices.

With such miniaturization and pixel number increase of image sensors, imaging lenses have been required to achieve higher performance such as higher resolution and higher image quality. Further, with their widespread use, imaging lenses have been required to be more low-cost.

To meet the higher performance requirements, imaging lenses including multiple lenses have been commonly used. Among others, there have been proposed five-lens imaging lenses that can achieve higher performance than three or four-lens imaging lenses.

JP-A-2007-264180 (Patent Document 1) discloses a high-performance-oriented imaging lens that includes: a first lens directing a convex surface toward the object side and having positive refractive power; a meniscus-shaped second lens directing a concave surface toward the image side and having negative refractive power; a meniscus-shaped third lens directing a convex surface toward the image side and having positive refractive power; a fourth lens having two aspheric surfaces, one of which is directed toward the image side and is concave near the optical axis, and having negative refractive power; and a fifth lens having two aspheric surfaces and having positive or negative refractive power. The first to fifth lenses are arranged in this order from the object side of the imaging lens.

JP-A-2007-298572 (Patent Document 2) discloses a high-performance-oriented imaging lens that includes: an aperture stop; a first lens having positive refractive power; a second lens bonded to the first lens and having negative refractive power; a meniscus-shaped third lens directing a concave surface toward an object side; a meniscus-shaped fourth lens directing a concave surface toward the object side; and a meniscus-shaped fifth lens having at least one aspheric surface and directing a convex surface toward the object side. The aperture stop and the first to fifth lenses are arranged in this order from the object side of the imaging lens.

JP-A-2010-262269 (Patent Document 3) discloses a higher-performance-oriented imaging lens that includes a first lens having positive refractive power; a second lens having negative refractive power; a third lens directing a convex surface toward the image side and having positive refractive power; a fourth lens having positive refractive power near the optical axis; and a fifth lens having negative refractive power near the optical axis. The first to fifth lenses are arranged in this order from the object side of the imaging lens. The image side surface of the fifth lens is concave near the optical axis and is a surface on which negative refractive power is weaker in a more peripheral area than in an area near the optical axis.

While the above-mentioned imaging lenses according to Patent Documents 1 to 3 include five lenses to increase performance, their long total lengths make it difficult to realize both their miniaturization and favorable aberration correction. The use of glass material also makes it difficult to reduce the cost.

SUMMARY OF THE INVENTION

An advantage of the present invention is to obtain an imaging lens for solid-state image sensors that is small and high-performance, as well as low-cost.

An imaging lens for use in solid-state image sensors according to an aspect of the present invention includes: an aperture stop; a biconvex first lens directing convex surfaces toward an object side and an image side; a second lens directing a convex surface toward the object side near an optical axis and having negative refractive power; a biconvex third lens directing convex surfaces toward the object side and the image side near the optical axis; a fourth lens directing a concave surface toward the object side near the optical axis and having positive refractive power; and a fifth lens directing a convex surface toward the object side near the optical axis and having negative refractive power. The aperture stop and the first to fifth lenses are arranged in this order from the object side of the imaging lens, and a conditional expression 1 is satisfied, the conditional expression 1 being $0.50 < f1/f < 0.76$ where $f1$ represents the focal length of the first lens and $f$ represents the focal length of the entire imaging lens.

In the above-mentioned configuration, the first and second lenses broadly generates required power and corrects chromatic aberration, and the third to fifth lenses mainly correct coma aberration, astigmatism, and field curvature. Since the second lens is formed into a meniscus shape where a convex surface is directed toward the object side near the optical axis, spherical aberration is favorably corrected. Further, since the third lens is formed into a biconvex shape where convex surfaces are directed toward the object side and the image side surface near the optical axis and has weak power so as to suppress influence on the power of the entire imaging lens, off-axis aberrations (in particular, coma aberration and field curvature) are favorably corrected. Further, the disposition of the aperture stop on the object side of the first lens facilitates control of the chief ray angle (CRA). That is, image sensors, which are required to be telecentric, easily control the incident angle of light beams and secure a sufficient light amount on the periphery having a small amount of light. Further, since the shapes and refractive power of the lenses are optimally balanced, a small, high-performance imaging lens is realized.

The conditional expression 1 defines the focal length of the first lens relative to that of the entire imaging lens. Confining the focal length of the first lens within the range of the conditional expression 1 can favorably correct spherical aberration and coma aberration while reducing the total optical length.

Exceeding the upper limit "0.76" of the conditional expression 1 weakens the power of the first lens excessively and increases the total optical length. This makes miniaturization difficult. Falling below the lower limit "0.50" strengthens the power of the first lens excessively. This is advantageous to miniaturization but makes it difficult to correct spherical aberration and coma aberration.

In the imaging lens having the above-mentioned configuration, both surfaces of the third lens are preferably aspheric, and a conditional expression 2 is preferably satisfied, the conditional expression 2 being $-0.80 < (r5+r6)/(r5-r6) < 0.55$ where $r5$ represents the curvature radius of an object side surface of the third lens and r6 represents the curvature radius of an image side surface thereof.

The above-mentioned conditional expression 2 defines the relationship between the curvature radius of the object side surface of the third lens and that of the image side surface thereof. Since the curvature radius of the image side surface is greater than that of the object side surface or, conversely, the curvature radius of the object side surface is greater than that of the image side surface, the third power is provided with weak positive power. This can favorably correct the aberrations while achieving miniaturization. Further, both surfaces of the third lens are preferably aspheric surfaces on which the sag amount varies to a lesser extent on the periphery than in an area near the optical axis. This can reduce the volume of the third lens in the optical axis direction, achieving miniaturization.

Exceeding the upper limit "0.55" of the conditional expression 2 or falling below the lower limit "−0.80" thereof disadvantageously makes it difficult to correct coma aberration and field curvature on the periphery and increases astigmatic difference. Falling outside the range of the conditional expression 2 disadvantageously increases the sensitivity to manufacturing errors of the third lens.

In the imaging lens having the above-mentioned configuration, a conditional expression 3 is preferably satisfied, the conditional expression 3 being $8.5 < r9/r10 < 85.0$ where r9 represents the curvature radius of an object side surface of the fifth lens and r10 represents the curvature radius of an image side surface thereof.

The conditional expression 3 defines the relationship between the curvature radius of the object side surface of the fifth lens and that of the image side surface thereof and is a condition for reducing the total optical length while correcting spherical aberration. Exceeding the upper limit "85.0" of the conditional expression 3 excessively strengthens the negative power of the fifth lens, which is disadvantageous to miniaturization. In contrast, falling below the lower limit "8.5" excessively weakens the negative power of the fifth lens, making it difficult to correct spherical aberration.

In the imaging lens having the above-mentioned configuration, a conditional expression 4 is preferably satisfied, the conditional expression 4 being $1.20 < f12/f < 1.95$ where f12 represents the composite focal length of the first and second lenses and f represents the focal length of the entire imaging lens.

The conditional expression 4 is a condition for favorably correcting field curvature and spherical aberration while keeping the total optical length of the imaging lens short. Exceeding the upper limit "1.95" of the conditional expression 4 weakens the composite power of the first and second lenses. This excessively increases the total optical length, making miniaturization difficult. Falling below the lower limit "1.20" excessively strengthens the composite power of the first and second lenses. This is advantageous to miniaturization but makes it difficult to favorably maintain field curvature and spherical aberration.

In the imaging lens having the above-mentioned configuration, a conditional expression 5 is preferably satisfied, the conditional expression 5 being $1.50 < f345/f < 9.00$ where f345 represents the composite focal length of the third to fifth lenses and f represents the focal length of the entire imaging lens.

The conditional expression 5 defines the composite focal length of the third to fifth lenses relative to the focal length of the entire imaging lens and is a condition for favorably correcting coma aberration and field curvature. Exceeding the upper limit "9.00" of the conditional expression 5 increases coma aberration, making it difficult to form a favorable image on the periphery of the imaging surface. On the other hand, falling below the lower limit "1.50" increases field curvature. This also makes it difficult to form a favorable image on the periphery of the imaging surface.

In the imaging lens having the above-mentioned configuration, conditional expressions 6 and 7 are preferably satisfied, the conditional expressions 6 and 7 being $2.10 < f3/f1 < 8.50$ and $0.65 < f4/f1 < 1.40$ where f1 represents the focal length of the first lens; f3 represents the focal length of the third lens; and f4 represents the focal length of the fourth lens.

The conditional expressions 6 and 7 define the power of the third and fourth lenses relative to that of the first lens. Since the positive power of the third lens is set so that it is weaker than that of the first lens in the imaging lens according to the aspect of the present invention, the third lens is provided with a field curvature correction effect. Further, since the positive power of the fourth lens is set so that it is approximately the same value as that of the first lens, increases in the sensitivity to manufacturing tolerances of the first and fourth lenses are suppressed with the total optical length limited.

Exceeding the upper limit "8.50" of the sixth conditional expression and the upper limit "1.40" of the seventh conditional expression excessively weakens the positive power of the entire imaging lens. This is advantageous in correcting field curvature and spherical aberration but makes miniaturization difficult. On the other hand, falling below the lower limit "2.10" of the sixth conditional expression and the lower limit "0.65" of the seventh conditional expression is advantageous to miniaturization but disadvantageously makes it difficult to correct field curvature and astigmatism. As seen, confining the power distribution of the three positive lenses within the ranges of the conditional expressions 6 and 7 can achieve miniaturization and aberration correction, as well as can obtain the effect of suppressing increases in the sensitivity to manufacturing tolerances.

In the imaging lens having the above-mentioned configuration, conditional expressions 8 and 9 are preferably satisfied, the conditional expressions 8 and 9 being $3.10 < r3/r4 < 6.80$ and $-1.40 < f2/f < -0.70$ where r3 represents the curvature radius of an object side surface of the second lens; r4 represents the curvature radius of an image side surface thereof; f2 represents the focal length thereof; and f represents the focal length of the entire imaging lens.

The eighth conditional expression defines the relationship between the center curvature radius of the object side surface of the second lens and that of the image side surface thereof and is a condition for miniaturization and favorable astigmatism correction. Exceeding the upper limit "6.80" of the eighth conditional expression makes the curvature radius of the image side surface of the second lens smaller than that of the object side surface thereof, generating a tight curvature. This increases the distance between the second and third lenses, making miniaturization difficult. On the other hand, falling below the lower limit "3.10" excessively strengthens the power of the object side surface of the second lens compared to that of the image side surface thereof. This disadvantageously makes it difficult to correct astigmatism. The ninth conditional expression defines the power of the second lens relative to that of the entire imaging lens and is a condition for favorably correcting chromatic aberration. Exceeding the upper limit "−0.70" of the ninth conditional expression excessively strengthens the negative power of the second lens. This is disadvantageous to miniaturization. On the other hand, falling below the lower limit "−1.40" excessively weakens the negative power of the second lens, making on axis chromatic aberration correction insufficient.

In the imaging lens having the above-mentioned configuration, a conditional expression 10 is preferably satisfied, the conditional expression 10 being 2.0≦f/EPD≦2.8 where EPD represents the diameter of the aperture stop and f represents the focal length of the entire imaging lens.

The conditional expression 10 is a condition for reducing the f-number while miniaturizing the imaging lens. Exceeding the upper limit "2.8" makes the aperture diameter smaller than the focal length of the entire imaging lens. This is advantageous to miniaturization but makes brightness on the image sensor insufficient. On the other hand, falling below the lower limit "2.0" makes the aperture diameter larger than the focal length of the entire imaging lens. This can reduce the f-number and thus form a bright imaging lens but makes miniaturization difficult. More preferably, in the imaging lens having the above-mentioned configuration, a conditional expression 10a is satisfied, the conditional expression 10a being 2.0≦f/EPD≦2.6.

Note that not all the above-mentioned conditional expressions need to be satisfied and that advantages can be obtained even when one or some of the conditional expressions are satisfied.

Further, all the lenses preferably include a plastic material. Making all the lenses using a plastic material allows mass production of lenses having a stable aspheric shape, reducing the cost. In the aspect of the present invention, most of chromatic aberration correction is performed by the second lens. The second lens is made using, for example, a high-dispersion material having a small Abbe's number, such as polycarbonate. The other lenses, the first lens and the third to fifth lenses, are made using, for example, the same cycloolefin polymer-based plastic material. Making the plastic lenses forming the imaging lens using the same plastic material where possible simplifies the manufacturing process.

DETAILED DESCRIPTION OF THE PREFERRED EMBODIMENTS

Now, an exemplary embodiment of the present invention will be described in detail with reference to the accompanying drawings. FIGS. 1, 3, 5, and 7 are sectional views of imaging lenses according to Examples 1 to 4 of the embodiment of the present invention. Any Example has the same basic lens configuration, and the configuration of the imaging lens according to this embodiment will be described with reference to the sectional view of the lens according to Example 1.

Figure 1:
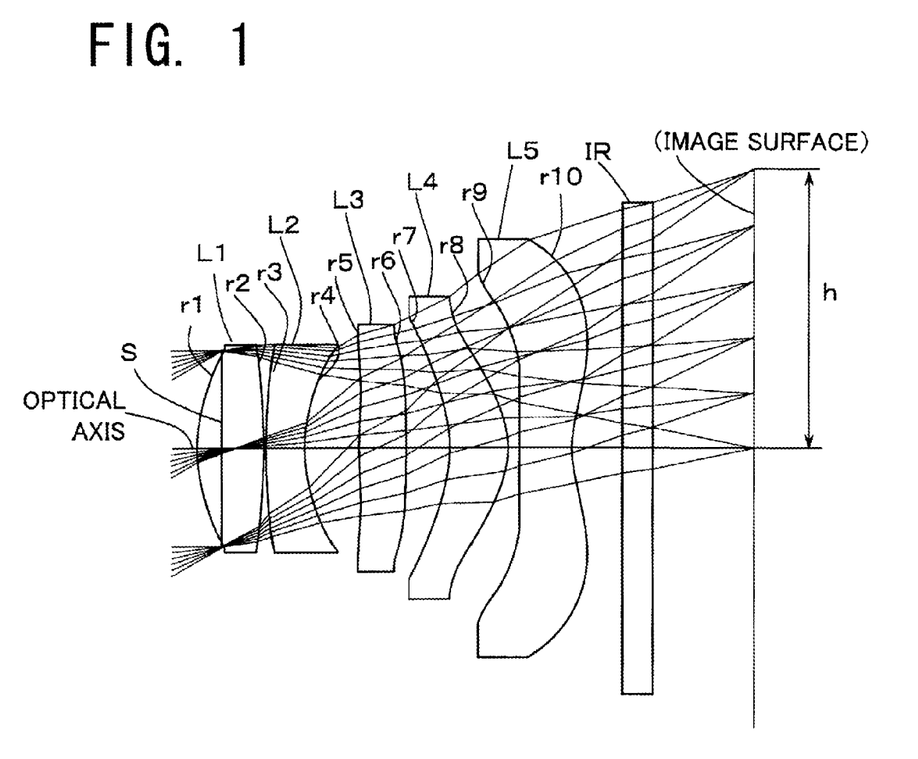
FIG. 1 is a sectional view of an imaging lens according to Example 1 of an embodiment of the present invention.

As shown in FIG. 1, the imaging lens according to this embodiment has therein an aperture stop S, a first lens L1, a second lens L2, a third lens L3, a fourth lens L4, and a fifth lens L5 arranged in this order from the object side of the imaging lens toward the image surface thereof. Disposed between the fifth lens L5 and the image surface is a cover glass IR. This cover glass may be omitted. In this embodiment, the aperture stop S is disposed between the vertex of the object side surface r1 of the first lens L1 and the end of the effective diameter of the surface r1. However, the position of the aperture stop S is not limited to this position and may be closer to the object than the vertex of the surface r1.

In the imaging lens having the above-mentioned configuration, the first lens L1 is a biconvex lens which directs convex surfaces toward the object side and the image side, and the second lens L2 is a meniscus-shaped lens directing a convex surface toward the object side near the optical axis and having negative refractive power. The third lens L3 is a biconvex lens directing convex surfaces toward the object side and the image side near the optical axis, the fourth lens L4 is a meniscus-shaped lens directing a concave surface toward the object side near the optical axis and having positive refractive power, and the fifth lens 15 is a meniscus-shaped lens directing a loose convex surface toward the object side near the optical axis and having negative refractive power.

Optimum shapes for miniaturization of the imaging lens are selected as the shapes of the lenses according to this embodiment. Among others, the third lens L3 significantly contributes to miniaturization. Both surfaces of the third lens 13 are aspheric surfaces which have few variations in sag amount from their portion near the optical axis to their periphery. This can reduce the volume of the third lens L3 in the optical axis direction, reducing the air space between the second lens 12, located on the object side of the third lens L3, and the fourth lens L4, located on the image side of the third lens L3. Thus, the entire imaging lens can be miniaturized.

The fifth lens L5 is meniscus-shaped and directs a loose convex surface toward the object side near the optical axis. An object side surface r9 of the fifth lens L5 is an aspheric surface, and its periphery more distant from the optical axis is more significantly bent toward the object side. Such a shape can reduce the distance between the fifth lens L5 and the fourth lens L4, realizing further miniaturization.

The imaging lens according to this embodiment is configured so as to meet the conditional expressions 1 to 10 below.

| | |
|---|---|
| $0.50 < f1/f < 0.76$ | conditional expression 1 |
| $-0.80 < (r5+r6)/(r5-r6) < 0.55$ | conditional expression 2 |
| $8.5 < r9/r10 < 85.0$ | conditional expression 3 |
| $1.20 < f12/f < 1.95$ | conditional expression 4 |
| $1.50 < f345/f < 9.00$ | conditional expression 5 |
| $2.10 < f3/f1 < 8.50$ | conditional expression 6 |
| $0.65 < f4/f1 < 1.40$ | conditional expression 7 |
| $3.10 < r3/r4 < 6.80$ | conditional expression 8 |
| $-1.40 < f2/f < -0.70$ | conditional expression 9 |
| $2.0 \leq f/EPD \leq 2.8$ | conditional expression 10 | where f represents the focal length of the entire imaging lens; f1 represents the focal length of the first lens L1; f2 represents the focal length of the second lens L2; f3 represents the focal length of the third lens L3; f4 represents the focal length of the fourth lens L4; f12 represents the composite focal length of the first lens L1 and the second lens L2; f345 represents the composite focal length of the third lens L3, the fourth lens L4, and the fifth lens L5; r3 represents the curvature radius of the object side surface of the second lens L2; r4 represents the curvature radius of the image side surface of the second lens L2; r5 represents the curvature radius of the object side surface of the third lens L3; r6 represents the curvature radius of the image side surface of the third lens L3; r9 represents the curvature radius of the object side surface of the fifth lens L5; r10 represents the curvature radius of the image side surface of the fifth lens L5; and EPD represents the diameter of the aperture stop.

In this embodiment, all the lens surfaces are aspheric. The aspheric shapes of these lens surfaces are represented by the formula below.

f-number, and $\omega$ represents the half angle of view. i represents the surface number counted from the object side, R represents the radius of curvature, d represents the inter-lens surface distance (spacing) along the optical axis, Nd represents the refraction index relative to the d line, and vd represents the Abbe's number relative to the d line. Note that the aspheric surfaces are shown with a symbol * (asterisk) attached to the back of their surface number i.

Example 1

Basic data about the imaging lens according to Example 1 is shown in Table 1.

TABLE 1

| | | f = 4.831 Fno = 2.404 $\omega$ = 30.52° | | | |
|---|---|---|---|---|---|
| i | | R | d | Nd | vd |
| S (aperture stop) | | ∞ | −0.245 | | |
| 1* | | 1.922 | 0.6719 | 1.5346 | 56.2 |
| 2* | | −5.167 | 0.023 | | |
| 3* | | 7.038 | 0.387 | 1.6142 | 25.6 |
| 4* | | 1.620 | 0.556 | | |
| 5* | | 8.503 | 0.469 | 1.5346 | 56.2 |
| 6* | | −50.000 | 0.4395 | | |
| 7* | | −1.721 | 0.59 | 1.5346 | 56.2 |
| 8* | | −0.973 | 0.12 | | |
| 9* | | 11.940 | 0.5328 | 1.5346 | 56.2 |
| 10* | | 1.387 | 0.5 | | |
| 11 | | ∞ | 0.3 | 1.5168 | 64.2 |
| 12 | | ∞ | 1.004 | | |
| IMA | | ∞ | | | |

| i | k | $A_4$ | $A_6$ | $A_8$ | $A_{10}$ | $A_{12}$ | $A_{14}$ |
|---|---|---|---|---|---|---|---|
| 1* | −9.000E−01 | 1.430E−02 | −1.080E−02 | 5.887E−03 | −2.142E−03 | −1.326E−03 | −3.454E−03 |
| 2* | −1.047E+02 | 9.432E−03 | 1.860E−02 | −3.020E−02 | −1.020E−02 | 7.164E−03 | −1.107E−03 |
| 3* | 1.480E+01 | −2.200E−02 | 6.650E−02 | −5.380E−02 | 1.540E−03 | −8.125E−05 | 5.368E−03 |
| 4* | −5.590E−01 | −1.289E−01 | 1.729E−01 | −1.069E−01 | 3.120E−02 | −3.246E−03 | 3.809E−03 |
| 5* | −3.000E+02 | −4.320E−02 | −2.420E−02 | 1.130E−02 | 6.194E−03 | 3.310E−03 | −6.472E−04 |
| 6* | 0.000E+00 | −8.460E−02 | 5.240E−02 | −4.560E−02 | 1.720E−02 | −6.281E−04 | 6.879E−04 |
| 7* | 4.100E−01 | 3.590E−02 | 8.680E−02 | −5.010E−02 | 1.410E−02 | −4.669E−04 | 0.000E+00 |
| 8* | −2.797E+00 | −1.370E−02 | −5.428E−03 | 2.020E−02 | −3.985E−03 | −6.448E−04 | 1.466E−04 |
| 9* | 1.4901E+01 | −7.790E−02 | −6.999E−03 | 3.258E−03 | 6.719E−04 | −1.351E−05 | −2.811E−05 |
| 10* | −1.010E+01 | −7.840E−02 | 1.900E−02 | −5.454E−03 | 9.781E−04 | −8.262E−05 | 0.000E+00 |

| | |
|---|---|
| f1 | 2.709 |
| f2 | −3.523 |
| f3 | 13.631 |
| f12 | 6.419 |
| f345 | 16.425 |
| EPD | 2.010 |

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} \quad \text{Formula 1}$$

where Z represents the axis in the optical axis direction; H represents the height in the direction perpendicular to the optical axis; k represents the conic coefficient; and A4, A6, A8, A10, A12, and A14 represent aspheric coefficients.

The imaging lens according to Examples of this embodiment will be described. In each Example, f represents the focal length of the entire imaging lens, Fno represents the The values of the conditional expressions in Example 1 are shown below.

$f1/f$=0.56

$(r5+r6)/(r5-r6)$=−0.71

$r9/r10$=8.61

$f12/f$=1.33

$f345/f$=3.40

$f3/f1$=5.03

$f4/f1$=1.21

$r3/r4$=4.34

$f2/f=-0.73$ $f/EPD=2.40$

As seen, the imaging lens according to Example 1 satisfies the conditional expressions 1 to 10.

Figure 2:
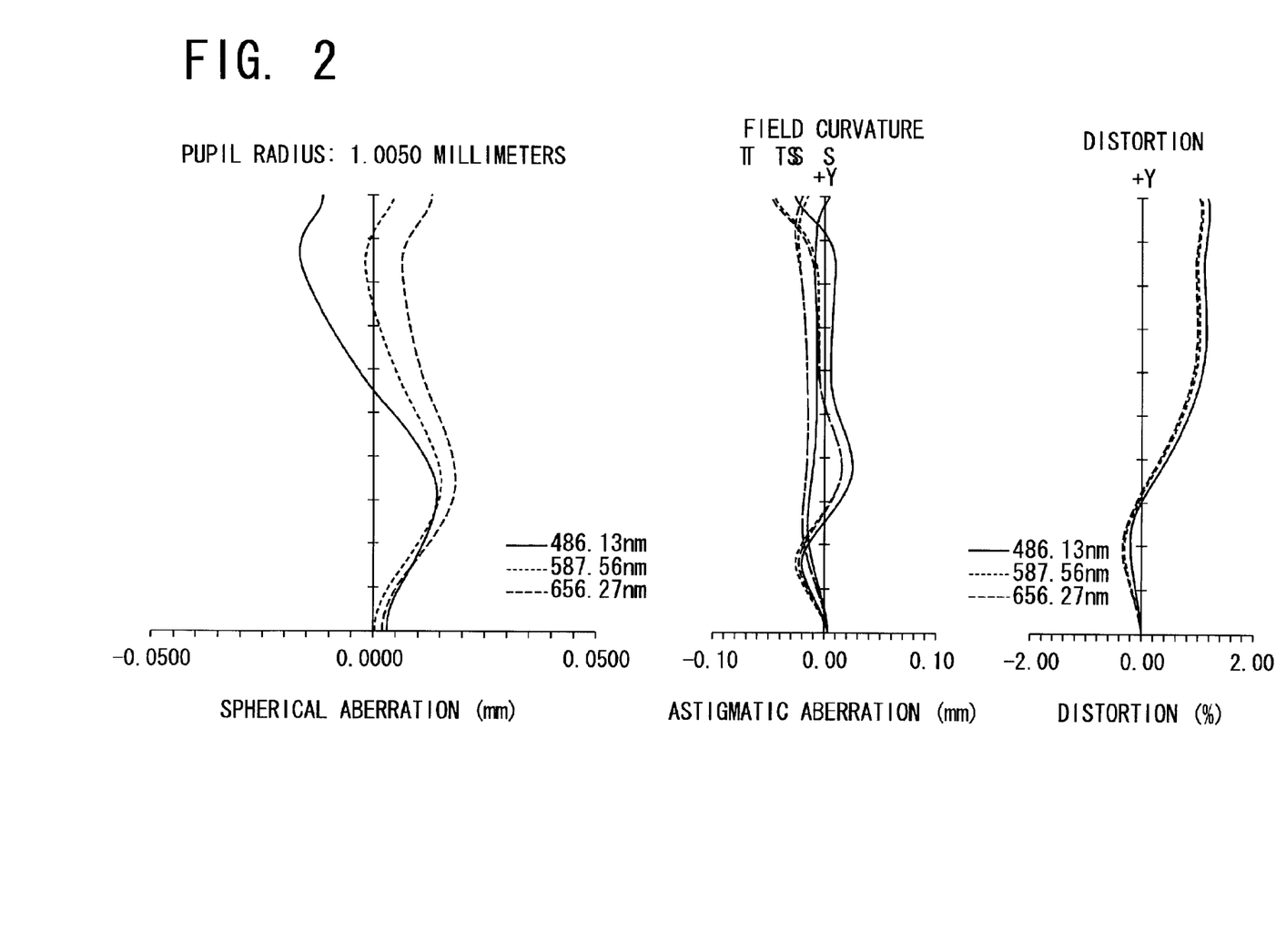
FIG. 2 includes graphs showing an aberration of the imaging lens according to Example 1.
Figure 3:
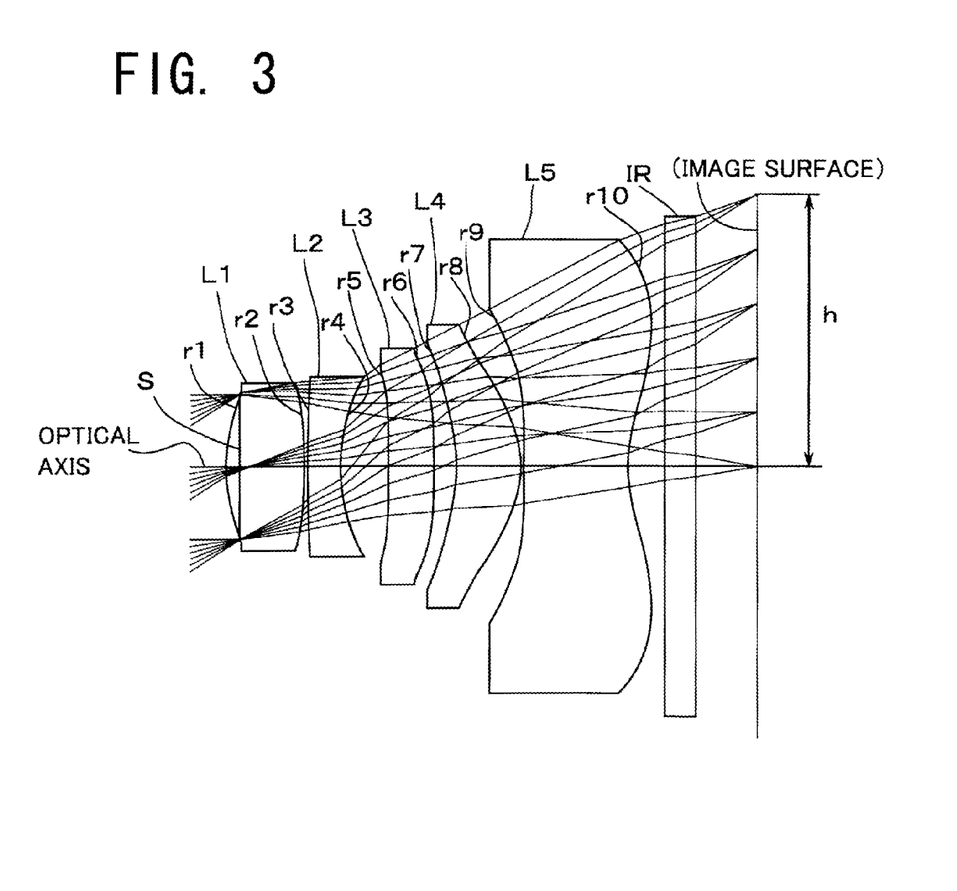
FIG. 3 is a sectional view of an imaging lens according to Example 2 of the embodiment of the present invention.

FIG. 2 includes an aberration graph showing the spherical aberration (mm) of the imaging lens according to Example 1, an aberration graph showing the astigmatism (field curvature) (mm) thereof, and an aberration graph showing the distortion (%) thereof. These aberration graphs each show aberration amounts corresponding to wavelengths 587.56 nm, 656.27 nm, and 486.13 nm. The astigmatism graph shows the aberration amount on a sagittal image surface S and the aberration amount on a tangential image surface T (same in FIGS. 4, 6, and 8).

As shown in FIG. 2, the aberrations are favorably corrected in the imaging lens according to Example 1. Further, the air conversion distance TL from the object side surface of the first lens L1 to the image surface is as short as 5.49 mm. Further, TL/2h=0.95 where h represents the maximum image height of the imaging area, suggesting that the image lens is favorably miniaturized.

Example 2

Basic data about the imaging lens according to Example 2 is shown in Table 2.

TABLE 2

| | | | | | |
|---|---|---|---|---|---|
| $f = 4.30$ Fno $= 2.80$ $\omega = 33.72°$ | | | | | |
| i | | R | d | Nd | vd |
| S (aperture stop) | | ∞ | −0.14 | | |
| 1* | | 1.914 | 0.8 | 1.5346 | 56.2 |
| 2* | | −4.550 | 0.0316 | | |
| 3* | | 13.532 | 0.341 | 1.6142 | 25.6 |
| 4* | | 2.004 | 0.487 | | |
| 5* | | 50.000 | 0.461 | 1.5346 | 56.2 |
| 6* | | −15.274 | 0.231 | | |
| 7* | | −2.309 | 0.66 | 1.5346 | 56.2 |
| 8* | | −1.155 | 0.03 | | |
| 9* | | 70.000 | 1.06 | 1.5346 | 56.2 |
| 10* | | 1.531 | 0.38 | | |
| 11 | | ∞ | 0.3 | 1.5168 | 64.2 |
| 12 | | ∞ | 0.622 | | |
| IMA | | ∞ | | | |

| i | k | $A_4$ | $A_6$ | $A_8$ | $A_{10}$ | $A_{12}$ | $A_{14}$ |
|---|---|---|---|---|---|---|---|
| 1* | −1.050E+00 | 2.815E−03 | 1.440E−02 | −3.030E−02 | 0.000E+00 | 0.000E+00 | 0.000E+00 |
| 2* | 0.000E+00 | 4.410E−02 | −7.010E−02 | 3.583E−03 | 0.000E+00 | 0.000E+00 | 0.000E+00 |
| 3* | −4.100E+01 | −2.050E−02 | 5.170E−02 | −7.660E−02 | 3.520E−02 | 0.000E+00 | 0.000E+00 |
| 4* | 0.000E+00 | −9.620E−02 | 1.891E−01 | −1.906E−01 | 1.289E−01 | −3.430E−02 | 0.000E+00 |
| 5* | 1.470E+02 | −9.320E−02 | −2.630E−02 | 4.700E−02 | −1.860E−02 | 1.190E−02 | 0.000E+00 |
| 6* | 0.000E+00 | −7.150E−02 | 1.610E−02 | −3.810B−02 | 1.320E−02 | 5.080E−03 | 0.000E+00 |
| 7* | 1.380E+00 | 6.860E−02 | 1.840E−02 | −3.500E−02 | 9.312E−03 | 2.952E−03 | 0.000E+00 |
| 8* | −2.700E+00 | −3.830E−02 | 1.520E−02 | 1.210E−02 | −7.534E−03 | 1.282E−03 | 0.000E+00 |
| 9* | 0.000E+00 | −9.020E−02 | 1.266E−02 | 3.429E−03 | −9.405E−04 | 0.000E+00 | 0.000E+00 |
| 10* | −7.200E+00 | −5.290E−02 | 1.555E−02 | −4.154E−03 | 6.797E−04 | −6.219E−05 | 2.232E−06 |

| | |
|---|---|
| f1 | 2.634 |
| f2 | −3.873 |
| f3 | 21.939 |
| f12 | 5.355 |
| f345 | 37.144 |
| EPD | 1.535 |

The values of the conditional expressions in Example 2 are shown below.

$f1/f=0.613$ $(r5+r6)/(r5-r6)=0.53$ $r9/r10=45.732$ $f12/f=1.25$ $f345/f=8.64$ $f3/f1=8.33$ $f4/f1=1.37$ $r3/r4=6.75$ $f2/f=-0.90$ $f/EPD=2.80$

As seen, the imaging lens according to Example 2 satisfies the conditional expressions 1 to 10.

Figure 4:
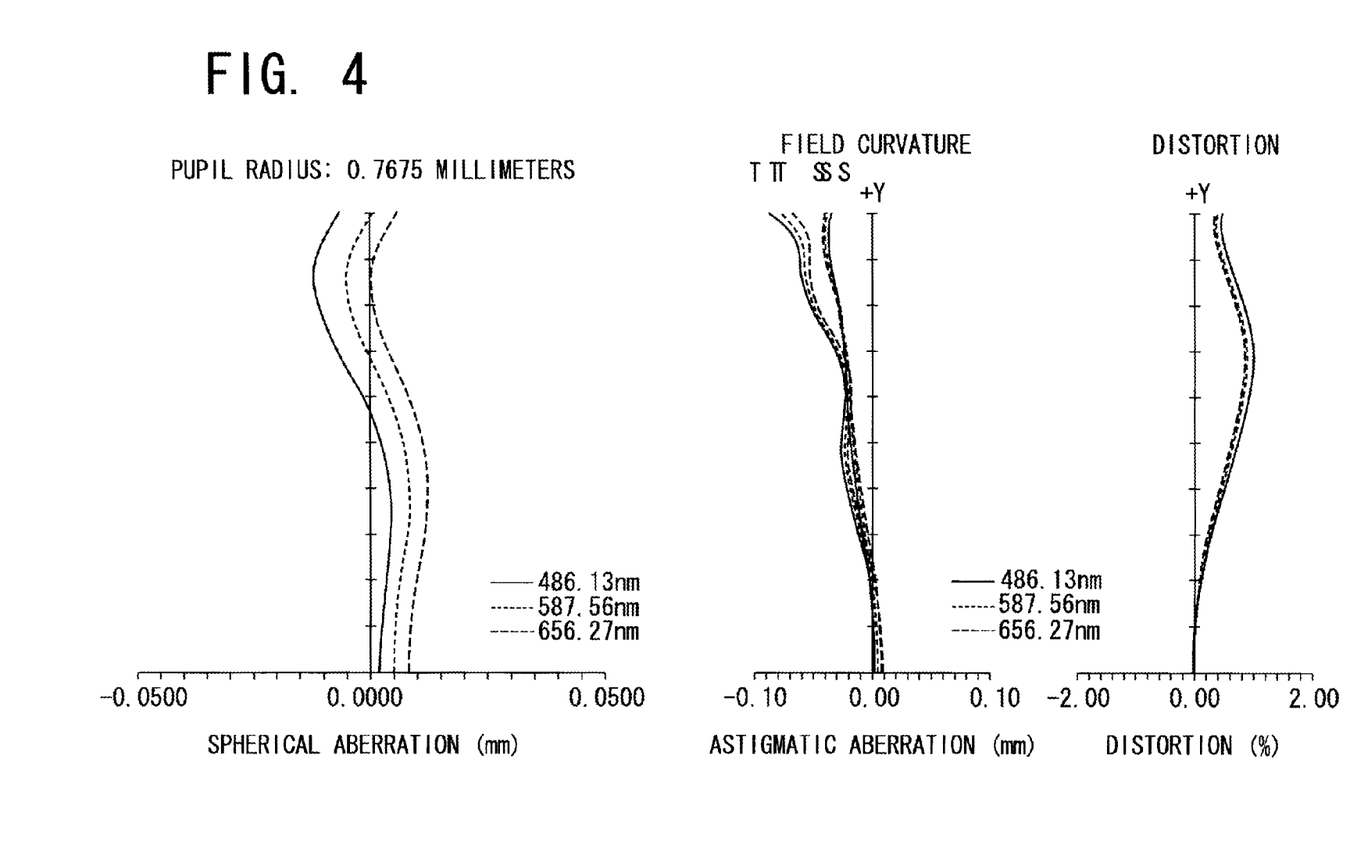
FIG. 4 includes graphs showing an aberration of the imaging lens according to Example 2.
Figure 5:
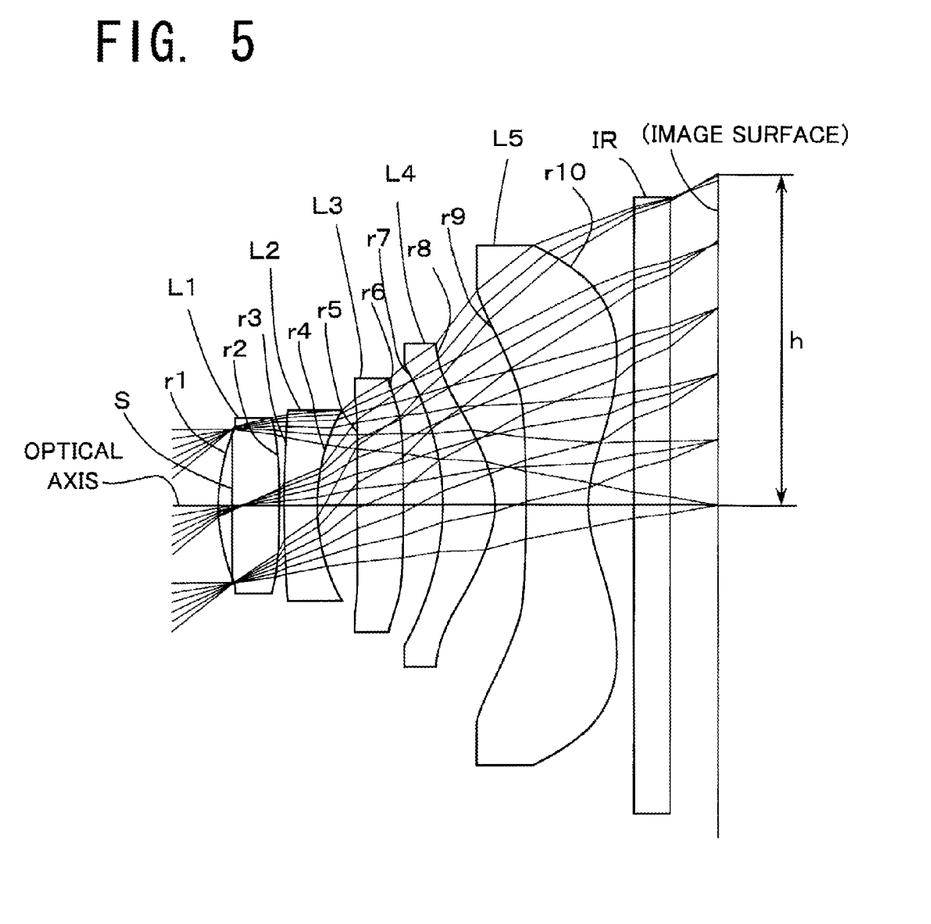
FIG. 5 is a sectional view of an imaging lens according to Example 3 of the embodiment of the present invention.

FIG. 4 includes an aberration graph showing the spherical aberration (mm) of the imaging lens according to Example 2, an aberration graph showing the astigmatism (field curvature) (mm) thereof, and an aberration graph showing the distortion (%) thereof. As shown in FIG. 4, the aberrations are favorably corrected in the imaging lens according to Example 2. Further, the air conversion distance TL from the object side surface of the first lens L1 to the image surface is as short as 5.31 mm. Further, TL/2h=0.92 where h represents the maximum image height of the imaging area, suggesting that the image lens is favorably miniaturized.

Example 3

Basic data about the imaging lens according to Example 3 is shown in Table 3.

TABLE 3

| f = 3.409 Fno = 2.550 ω = 39.996° | | | | | |
|---|---|---|---|---|---|
| i | R | d | | Nd | νd |
| S (aperture stop) | ∞ | −0.12 | | | |
| 1* | 1.586 | 0.518 | | 1.5346 | 56.2 |
| 2* | −6.103 | 0.038 | | | |
| 3* | 8.851 | 0.28 | | 1.6142 | 25.6 |
| 4* | 1.759 | 0.3314 | | | |
| 5* | 8.348 | 0.3945 | | 1.5346 | 56.2 |
| 6* | 66.000 | 0.336 | | | |
| 7* | −2.068 | 0.4367 | | 1.5346 | 56.2 |
| 8* | −0.908 | 0.255 | | | |
| 9* | 23.673 | 0.53 | | 1.5346 | 56.2 |
| 10* | 1.089 | 0.38 | | | |
| 11 | ∞ | 0.3 | | 1.5168 | 64.2 |
| 12 | ∞ | 0.391 | | | |
| IMA | ∞ | | | | |

| i | k | $A_4$ | $A_6$ | $A_8$ | $A_{10}$ | $A_{12}$ | $A_{14}$ |
|---|---|---|---|---|---|---|---|
| 1* | −1.000E+00 | 5.821E−03 | 2.220E−02 | −1.435E−01 | 0.000E+00 | 0.000E+00 | 0.000E+00 |
| 2* | 0.000E+00 | 7.423E−03 | −1.152E−01 | −2.403E−01 | 0.000E+00 | 0.000E+00 | 0.000E+00 |
| 3* | −1.680E+02 | −3.130E−02 | 3.670E−02 | −5.950E−02 | 1.349E−01 | 0.000E+00 | 0.000E+00 |
| 4* | 0.000E+00 | −9.610E−02 | 1.910E−01 | −1.769E−01 | 1.600E−01 | −3.130E−02 | 0.000E+00 |
| 5* | −9.400E+01 | −9.200E−02 | 6.268E−03 | 4.880E−02 | −3.860E−02 | 2.407E−04 | 0.000E+00 |
| 6* | 0.000E+00 | −8.910E−02 | 3.784E−03 | −2.820E−02 | 1.800E−02 | 6.949E−03 | 0.000E+00 |
| 7* | 1.170E+00 | 7.550E−02 | 6.515E−03 | −3.460E−02 | 1.210E−02 | 4.966E−03 | 0.000E+00 |
| 8* | −2.865E+00 | −2.270E−02 | 2.790E−02 | 1.540E−02 | −8.151E−03 | 6.265E−04 | 0.000E+00 |
| 9* | 0.000E+00 | −9.070E−02 | 8.390E−03 | 3.833E−03 | −5.748E−04 | 0.000E+00 | 0.000E+00 |
| 10* | −6.930E+00 | −6.880E−02 | 1.950E−02 | −5.903E−03 | 8.829E−04 | −5.596E−05 | −9.142E−07 |

| | |
|---|---|
| f1 | 2.412 |
| f2 | −3.629 |
| f3 | 13.888 |
| f12 | 5.003 |
| f345 | 14.103 |
| EPD | 1.335 |

The values of the conditional expressions in Example 3 are shown below.

$f1/f=0.708$ $(r5+r6)/(r5-r6)=-0.78$ $r9/r10=21.739$ $f12/f=1.47$ $f345/f=4.14$ $f3/f1=5.76$ $f4/f1=1.11$ $r3/r4=5.03$ $f2/f=-1.06$ $f/EPD=2.55$

As seen, the imaging lens according to Example 3 satisfies the conditional expressions 1 to 10.

Figure 6:
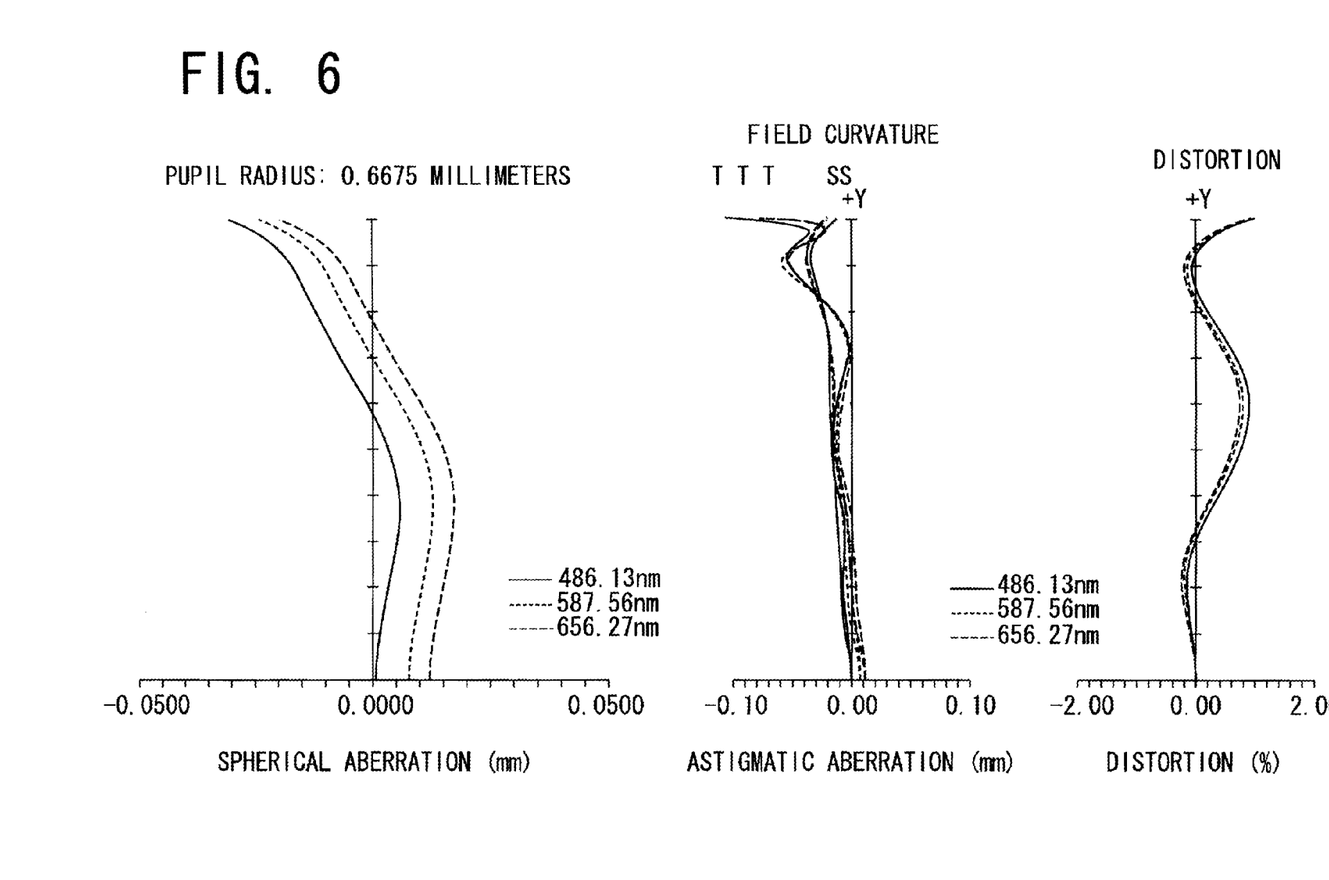
FIG. 6 includes graphs showing an aberration of the imaging lens according to Example 3.
Figure 7:
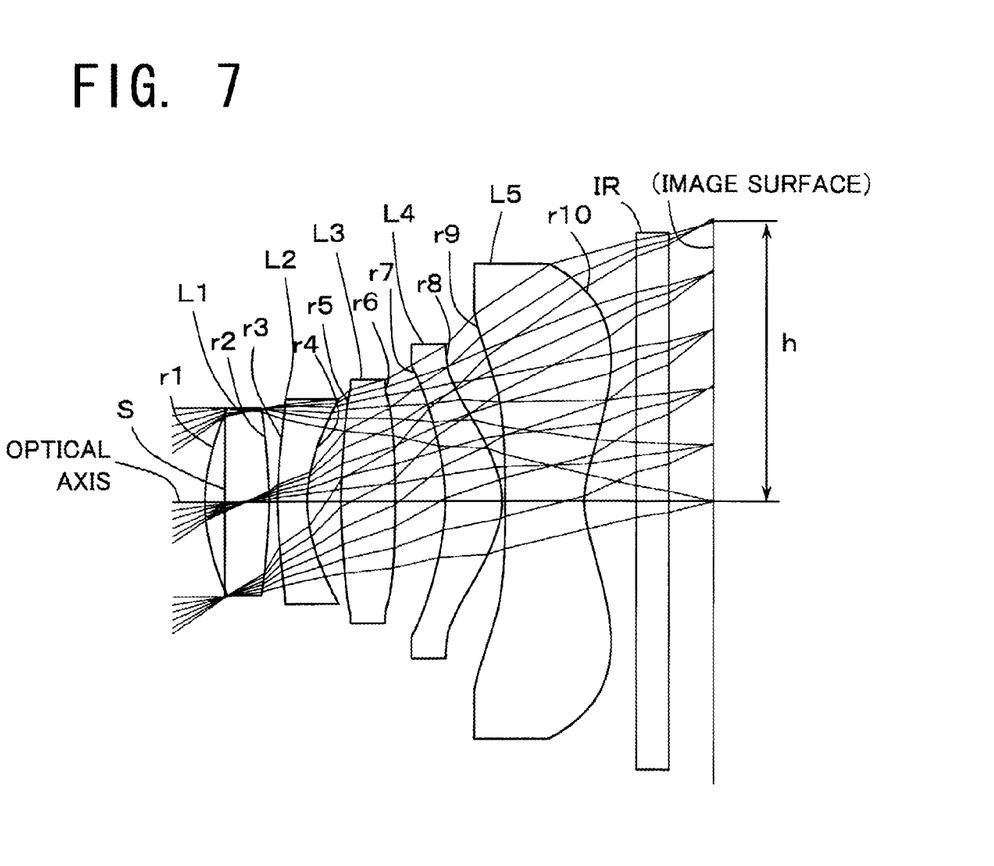
FIG. 7 is a sectional view of an imaging lens according to Example 4 of the embodiment of the present invention.

FIG. 6 includes an aberration graph showing the spherical aberration (mm) of the imaging lens according to Example 3, an aberration graph showing the astigmatism (field curvature) (mm) thereof, and an aberration graph showing the distortion (%) thereof. As shown in FIG. 6, the aberrations are favorably corrected in the imaging lens according to Example 3. Further, the air conversion distance TL from the object side surface of the first lens L1 to the image surface is as short as 4.096 mm. Further, TL/2h=0.71 where h represents the maximum image height of the imaging area, suggesting that the image lens is favorably miniaturized.

Example 4

Basic data about the imaging lens according to Example 4 is shown in Table 4.

As seen, the imaging lens according to Example 4 satisfies the conditional expressions 1 to 10.

Figure 8:
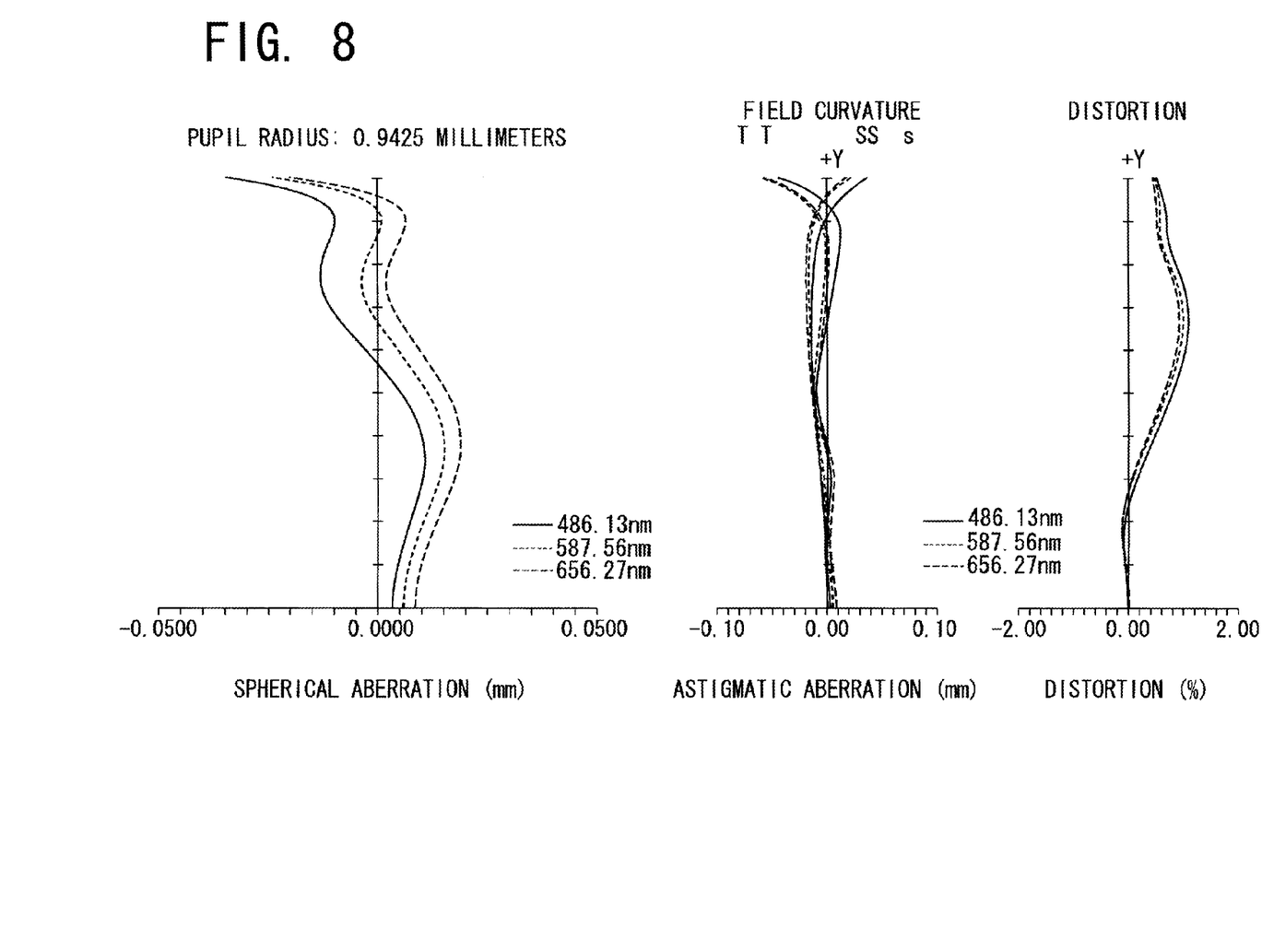
FIG. 8 includes graphs showing an aberration of the imaging lens according to Example 4.

FIG. 8 includes an aberration graph showing the spherical aberration (mm) of the imaging lens according to Example 4, an aberration graph showing the astigmatism (field curvature) (mm) thereof, and an aberration graph showing the distortion (%) thereof. As shown in FIG. 8, the aberrations are favorably corrected in the imaging lens according to Example 4. Further, the air conversion distance TL from the object side surface of the first lens L1 to the image surface is as short as 4.78 mm. Further, TL/2h=0.83 where h represents the maxi-

TABLE 4

| $f = 3.775\ Fno = 2.00\ \omega = 37.269°$ | | | | |
|---|---|---|---|---|
| i | R | d | Nd | vd |
| S (aperture stop) | ∞ | −0.19 | | |
| 1* | 2.023 | 0.61 | 1.5346 | 56.2 |
| 2* | −5.183 | 0.0845 | | |
| 3* | 4.718 | 0.29 | 1.6142 | 25.6 |
| 4* | 1.450 | 0.321 | | |
| 5* | 5.009 | 0.519 | 1.5346 | 56.2 |
| 6* | −34.447 | 0.4905 | | |
| 7* | −2.520 | 0.5424 | 1.5346 | 56.2 |
| 8* | −0.940 | 0.03 | | |
| 9* | 95.000 | 0.766 | 1.5346 | 56.2 |
| 10* | 1.140 | 0.5 | | |
| 11 | ∞ | 0.3 | 1.5168 | 64.2 |
| 12 | ∞ | 0.421 | | |
| IMA | ∞ | | | |

| i | k | $A_4$ | $A_6$ | $A_8$ | $A_{10}$ | $A_{12}$ | $A_{14}$ |
|---|---|---|---|---|---|---|---|
| 1* | 0.000E+00 | −1.390E−02 | 1.220E−02 | −2.700E−02 | 0.000E+00 | 0.000E+00 | 0.000E+00 |
| 2* | 0.000E+00 | 7.270E−02 | −6.140E−02 | 0.000E+00 | 0.000E+00 | 0.000E+00 | 0.000E+00 |
| 3* | −4.330E+01 | −3.300E−02 | 1.068E−01 | −1.238E−01 | 3.420E−02 | 1.160E−02 | 0.000E+00 |
| 4* | −1.451E+00 | −1.690E−01 | 2.655E−01 | −1.954E−01 | 5.570E−02 | 3.393E−03 | 0.000E+00 |
| 5* | −1.800E+01 | −4.730E−02 | −6.790E−03 | 3.630E−02 | −5.400E−03 | 0.000E+00 | 0.000E+00 |
| 6* | 0.000E+00 | −4.970E−02 | 2.030E−02 | −4.440E−02 | 2.460E−02 | 1.251E−03 | 0.000E+00 |
| 7* | 2.120E+00 | 1.450E−02 | 5.820E−02 | −3.100E−02 | 4.256E−03 | 2.075E−03 | 0.000E+00 |
| 8* | −3.130E+00 | −5.450E−02 | 3.400E−02 | 1.830E−02 | −9.964E−03 | 1.030E−03 | 0.000E+00 |
| 9* | 0.000E+00 | −6.440E−02 | 8.226E−03 | 2.074E−03 | −3.618E−04 | 0.000E+00 | 0.000E+00 |
| 10* | −7.250E+00 | −6.090E−02 | 1.880E−02 | −5.456E−03 | 8.217E−04 | −5.400E−05 | 0.000E+00 |

| | | |
|---|---|---|
| | f1 | 2.804 |
| | f2 | −3.527 |
| | f3 | 8.217 |
| | f12 | 7.217 |
| | f345 | 6.969 |
| | EPD | 1.885 |

The values of the conditional expressions in Example 4 are shown below.

$f1/f=0.743$ $(r5+r6)/(r5-r6)=-0.75$ $r9/r10=83.359$ $f12/f=1.91$ $f345/f=1.85$ $f3/f1=2.93$ $f4/f1=0.89$ $r3/r4=3.25$ $f2/f=-0.93$ $f/EPD=2.00$ mum image height of the imaging area, suggesting that the image lens is favorably miniaturized.

Accordingly, application of the imaging lens according to this embodiment to imaging optical systems such as cellular phones, digital still cameras, mobile information terminals, security cameras, on-board cameras, and network cameras can achieve both greater functionality and miniaturization of the imaging optical systems.

In the imaging lens according to the aspect of the present invention, both miniaturization and favorable aberration correction are achieved. Thus, it is possible to provide a small, low-cost imaging lens that favorably corrects aberrations.

What is claimed is:

1. An imaging lens for use in solid-state image sensors, comprising:

an aperture stop;

a biconvex first lens directing convex surfaces toward an object side and an image side;

a second lens directing a convex surface toward the object side near an optical axis and having negative refractive power;

a biconvex third lens directing convex surfaces toward the object side and the image side near the optical axis;

a fourth lens directing a concave surface toward the object side near the optical axis and having positive refractive power; and a fifth lens directing a convex surface toward the object side near the optical axis and having negative refractive power, wherein the aperture stop and the first to fifth lenses are arranged in this order from the object side of the imaging lens toward an image surface thereof, and a conditional expression 1 is satisfied, the conditional expression 1 being $0.50 < f1/f < 0.76$ where f1 represents the focal length of the first lens and f represents the focal length of the entire imaging lens.

2. The imaging lens according to claim 1, wherein a conditional expression 2 is satisfied, the conditional expression 2 being $-0.80 < (r5+r6)/(r5-r6) < 0.55$ where r5 represents the curvature radius of the object side surface of the third lens and r6 represents the curvature radius of the image side surface thereof.

3. The imaging lens according to claim 2, wherein a conditional expression 4 is satisfied, the conditional expression 4 being $1.20 < f12/f < 1.95$ where f12 represents the composite focal length of the first and second lenses and f represents the focal length of the entire imaging lens.

4. The imaging lens according to claim 3, wherein a conditional expression 5 is satisfied, the conditional expression 5 being $1.50 < f345/f < 9.00$ where f345 represents the composite focal length of the third to fifth lenses and f represents the focal length of the entire imaging lens.

5. The imaging lens according to claim 1, wherein a conditional expression 3 is satisfied, the conditional expression 3 being $8.5 < r9/r10 < 85.0$ where r9 represents the curvature radius of the object side surface of the fifth lens and r10 represents the curvature radius of the image side surface thereof.

6. The imaging lens according to claim 5, wherein a conditional expression 4 is satisfied, the conditional expression 4 being $1.20 < f12/f < 1.95$ where f12 represents the composite focal length of the first and second lenses and f represents the focal length of the entire imaging lens.

7. The imaging lens according to claim 6, wherein a conditional expression 5 is satisfied, the conditional expression 5 being $1.50 < f345/f < 9.00$ where f345 represents the composite focal length of the third to fifth lenses and f represents the focal length of the entire imaging lens.

8. The imaging lens according to claim 1, wherein a conditional expression 4 is satisfied, the conditional expression 4 being $1.20 < f12/f < 1.95$ where f12 represents the composite focal length of the first and second lenses and f represents the focal length of the entire imaging lens.

9. The imaging lens according to claim 8, wherein a conditional expression 5 is satisfied, the conditional expression 5 being $1.50 < f345/f < 9.00$ where f345 represents the composite focal length of the third to fifth lenses and f represents the focal length of the entire imaging lens.

10. The imaging lens according to claim 1, wherein conditional expressions 6 and 7 are satisfied, the conditional expressions 6 and 7 being $2.10 < f3/f1 < 8.50$ and $0.65 < f4/f1 < 1.40$ where f1 represents the focal length of the first lens; f3 represents the focal length of the third lens; and f4 represents the focal length of the fourth lens.

11. The imaging lens according to claim 1, wherein conditional expressions 8 and 9 are satisfied, the conditional expressions 8 and 9 being $3.10 < r3/r4 < 6.80$ and $-1.40 < f2/f < -0.70$ are satisfied where r3 represents the curvature radius of the object side surface of the second lens; r4 represents the curvature radius of the image side surface thereof; f2 represents the focal length thereof; and f represents the focal length of the entire imaging lens.

12. The imaging lens according to claim 1, wherein a conditional expression 10 is satisfied, the conditional expression 10 being $2.0 \leq f/EPD \leq 2.8$ where EPD represents the diameter of the aperture stop and f represents the focal length of the entire imaging lens.

* * * * *